(12) United States Patent
Ide

(10) Patent No.: US 10,065,258 B2
(45) Date of Patent: Sep. 4, 2018

(54) ARC WELDING CONTROL METHOD

(71) Applicant: DAIHEN CORPORATION, Osaka (JP)

(72) Inventor: Akihiro Ide, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 2 days.

(21) Appl. No.: 15/122,278

(22) PCT Filed: Mar. 10, 2015

(86) PCT No.: PCT/JP2015/056949
§ 371 (c)(1),
(2) Date: Aug. 29, 2016

(87) PCT Pub. No.: WO2015/137315
PCT Pub. Date: Sep. 17, 2015

(65) Prior Publication Data
US 2016/0368075 A1 Dec. 22, 2016

(30) Foreign Application Priority Data

Mar. 10, 2014 (JP) .................................. 2014-046078

(51) Int. Cl.
*B23K 10/00* (2006.01)
*B23K 9/073* (2006.01)
(Continued)

(52) U.S. Cl.
CPC ............ *B23K 9/0738* (2013.01); *B23K 9/073* (2013.01); *B23K 9/09* (2013.01); *B23K 9/124* (2013.01)

(58) Field of Classification Search
CPC ........ B23K 9/0738; B23K 9/073; B23K 9/09; B23K 9/24; B23K 9/125; B23K 10/0061
(Continued)

(56) References Cited

U.S. PATENT DOCUMENTS 7,842,904 B2 * 11/2010 Nakata ................. B23K 9/0671
219/124.01
9,114,472 B2 * 8/2015 Matsui ................... B23K 9/092
(Continued)

FOREIGN PATENT DOCUMENTS

CN            1830611 A      9/2006
CN         102361722 A      2/2012
(Continued)

OTHER PUBLICATIONS

Search Report issued in International Patent Application No. PCT/JP2015/056949, dated Jun. 16, 2015.
(Continued)

*Primary Examiner* — Mark Paschall
(74) *Attorney, Agent, or Firm* — Greenblum & Bernstein, P.L.C.

(57) ABSTRACT

There is provided an arc welding control method of alternating feeding of a welding wire between forward feeding and reverse feeding periodically to generate a short-circuiting period and an arc period in a manner that shifting to the arc period is performed by reducing a welding current in the reverse feeding during the short-circuiting period. Reduction of the welding current is started from a time where a state of the reverse feeding reaches a predetermined reference state.

6 Claims, 4 Drawing Sheets

(51) Int. Cl.
*B23K 9/12* (2006.01)
*B23K 9/09* (2006.01)

(58) Field of Classification Search
USPC ..... 219/130.51, 137 R, 132, 121.54, 121.45, 219/121.46
See application file for complete search history.

(56) References Cited

U.S. PATENT DOCUMENTS

| | | | |
|---|---|---|---|
| 2006/0102695 A1* | 5/2006 | Era | B23K 9/091 228/101 |
| 2006/0201922 A1 | 9/2006 | Era et al. | |
| 2007/0051714 A1* | 3/2007 | Ou | B23K 9/073 219/130.21 |
| 2010/0176104 A1 | 7/2010 | Peters et al. | |
| 2010/0213181 A1 | 8/2010 | Hirota | |
| 2012/0074115 A1* | 3/2012 | Kazmaier | B23K 9/09 219/130.51 |
| 2012/0111842 A1 | 5/2012 | Fujiwara et al. | |
| 2012/0145691 A1* | 6/2012 | Fujiwara | B23K 9/073 219/130.31 |
| 2014/0203003 A1* | 7/2014 | Fujiwara | B23K 9/09 219/125.1 |
| 2015/0041449 A1* | 2/2015 | Fujiwara | B23K 9/073 219/130.21 |

FOREIGN PATENT DOCUMENTS

| | | |
|---|---|---|
| EP | 2216125 | 8/2010 |
| EP | 2402104 | 1/2012 |
| EP | 2692469 A1 | 2/2014 |
| JP | 2012-632 | 1/2012 |
| JP | 2012-71310 | 4/2012 |
| JP | 5201266 | 2/2013 |

OTHER PUBLICATIONS

Written Opinion (PCT/ISA/237) issued in International Patent Appl. No. PCT/JP2015/056949, dated Jun. 16, 2015.

Extended European Search Report for the European patent application No. 15761725.9 dated Nov. 7, 2017.

English translation of Written Opinion (PCT/ISA/237), together with Forms PCT/IB/338 and PCT/IB/373, issued for International Application No. PCT/JP2015/056949, dated Sep. 13, 2016.

Chinese Office Action dated Jun. 27, 2017 in Chinese Patent Application No. 201580003122.9 and machine English translation thereof.

Chinese Office Action dated Jan. 11, 2018 in Chinese Patent Application No. 201580003122.9 and machine English translation thereof.

\* cited by examiner

ARC WELDING CONTROL METHOD

TECHNICAL FIELD

The present invention relates to an arc welding control method of alternating feeding of a welding wire between forward feeding and reverse feeding periodically to generate a short-circuiting period and an arc period in a manner that shifting to the arc period is performed by reducing a welding current in the reverse feeding during the short-circuiting period.

BACKGROUND ART

In a typical consumable electrode arc welding, welding is performed by feeding a welding wire as a consumable electrode at a constant feeding rate and generating an arc between the welding wire and base material. In the consumable electrode arc welding, both the welding wire and the base material are mostly placed in a welding state in which a short-circuiting period and an arc period are alternately repeated.

In order to further improve welding quality, there has been proposed a welding method of alternating feeding of a welding wire between forward feeding and reverse feeding periodically (see a Patent Document 1, for example). Further there has been proposed a welding method of rapidly reducing a welding current in response to detection of a narrow part of a droplet as a precursory phenomenon of arc regeneration, and regenerating an arc in a small current-value state, thereby reducing a generation amount of spatter (see a Patent Document 2, for example). Hereinafter these welding methods will be explained.

FIG. 4 is a waveform diagram of the welding method in which the forward feeding and the reverse feeding are repeated periodically as to the feeding rate and a narrow-part detection control is performed. (A) of this figure shows a waveform of a feeding rate Fw, (B) of this figure shows a waveform of a welding current Iw and (C) of this figure shows a waveform of a welding voltage Vw. Hereinafter explanation will be made with reference to this figure.

As shown in (A) of this figure, in the feeding rate Fw, an upper side and a lower side than 0 represent a forward feeding period and a reverse feeding period, respectively. The forward feeding represents feeding of the welding wire in a direction approaching the base material, whilst the reverse feeding represents feeding of the welding wire in a direction separating from the base material. The feeding rate Fw has a waveform which changes sinusoidally and shifts on the forward feeding side. Thus as an average value of the feeding rate Fw is positive, the welding wire is fed forwardly in average.

As shown in (A) of this figure, the feeding rate Fw is 0 at a time t1. A period from the time t1 to a time t2 corresponds to a forward feeding acceleration period. The feeding rate is the maximum value of the forward feeding at the time t2. A period from the time t2 to a time t3 corresponds to a forward feeding deceleration period. The feeding rate is 0 at the time t3. A period from the time t3 to a time t4 corresponds to a reverse feeding acceleration period. The feeding rate is the maximum value of the reverse feeding at the time t4. A period from the time t4 to a time t5 corresponds to a reverse feeding deceleration period.

Short circuit between the welding wire and the base material occurs mostly before or after the maximum value of the forward feeding at the time t2. This figure shows a case where the short circuit occurs at a time t21 during the forward feeding deceleration period after the maximum value of the forward feeding. If the short circuit occurs at the time t21, the welding voltage Vw rapidly reduces to a short-circuit voltage value of a few volts as shown in (C) of this figure, and the welding current Iw also reduces to an initial current value of a small current value as shown in (B) of this figure. Thereafter the welding current Iw increases with a predetermined inclination. When the welding current reaches a predetermined peak value, the welding current is maintained at this value.

As shown in (A) of this figure, from the time t3, as the feeding rate Fw is placed in the reverse feeding period, the welding wire is reversely fed. The short circuit is released by this reverse feeding, and hence an arc is regenerated at a time t31. The arc is regenerated mostly before or after the maximum value of the reverse feeding at the time t4. This figure shows a case where the arc is generated at the time t31 during the reverse feeding acceleration period before the peak value of the reverse feeding.

If the arc is regenerated at the time t31, the welding voltage Vw increases rapidly to an arc voltage value of several tens of volts as shown in (C) of this figure. As shown in (B) of this figure, according to detection control of the narrow part of a droplet as a precursory phenomenon of arc regeneration, the welding current Iw rapidly reduces from a time earlier than the time t31 by several hundreds of μs and becomes a small current value at the arc regeneration time t31. In this respect, if the narrow part is formed at the droplet, a current path become narrow, and hence a resistance value or the welding voltage value between the welding wire and the base material increases. The narrow-part detection is performed by detecting this increase.

As shown in (A) of this figure, from the time t31 to the time t5, the feeding rate Fw is placed in a reverse feeding state. An arc length becomes long during this period. As shown in (B) of this figure, during the period from the time t31 to the time t5, the welding current Iw increases with a predetermined inclination, then reaches a predetermined high arc-current value and maintains this value for a predetermined period, and thereafter starts reducing.

As shown in (A) of this figure, the feeding rate Fw is placed in the forward feeding period from the time t5 and reaches a forward feeding peak value at a time t6. Then short circuit occurs at a time t61. During a period from the time t5 to the time t61, the welding voltage Vw reduces gradually as shown in (C) of this figure, and the welding current Iw also reduces gradually as shown in (B) of this figure.

As described above, a cycle of the short circuit and the arc substantially coincides with a cycle of the forward feeding and the reverse feeding as to the feeding rate. That is, according to this welding method, the cycle of short circuit and arc can be set to a desired value by suitably setting the cycle of forward feeding and reverse feeding as to the feeding rate. Thus, in particular, in a large current region, if this welding method is implemented, the cycle of short circuit and arc can be suppressed in its variance and made substantially constant. Consequently, in combination with the narrow-part detection control, the welding can be performed with a small generation amount of the spatter and good bead appearance.

PRIOR ART DOCUMENT

Patent Document

Patent Document 1: Japanese Patent No. 5201266
Patent Document 2: Japanese Patent Application Publication No. 2012-71310A

SUMMARY OF INVENTION

Problems to be Solved by Invention

However according to the narrow-part detection control, the narrow-part detection is performed by detecting a fine change of the resistance value or the welding voltage value between the welding wire and the base material. Thus it is necessary to detect a voltage (welding voltage near the arc generation portion) between a tip of a welding torch and the base material near an arc generation portion. In order to detect the welding voltage near the arc generation portion, a voltage detection line is required to be provided at each of the tip of welding torch and the base material near the arc generation portion. Providing the voltage detection lines is a troublesome work. Further as the welding torch moves frequently, the voltage detection lines are likely broken. Furthermore, in order to accurately detect the narrow part, it is required to finely adjust a detection sensitivity of the narrow part at every welding field and welding condition. Thus there arises a problem that the adjustment takes a lot of time.

Accordingly an object of the present invention is to provide an arc welding control method which, in a welding method of alternating feeding of a welding wire between forward feeding and reverse feeding periodically, can reduce a generation amount of spatter without detecting a narrow part.

Means for Solving Problems

In order to solve the above-described problem, according to the present invention, there is provided an arc welding control method of alternating feeding of a welding wire between forward feeding and reverse feeding periodically to generate a short-circuiting period and an arc period in a manner that shifting to the arc period is performed by reducing a welding current in the reverse feeding during the short-circuiting period, the arc welding control method comprising: starting reduction of the welding current from a time where a state of the reverse feeding reaches a predetermined reference state.

According to the present invention, in the arc welding control method, the state of reverse feeding is a time period from start of the reverse feeding, and the reference state is a reference time period.

According to the present invention, in the arc welding control method, the state of reverse feeding is a feeding rate of the reverse feeding, and the reference state is a reference feeding rate.

According to the present invention, in the arc welding control method, the state of reverse feeding is a phase of the reverse feeding, and the reference state is a reference phase.

According to the present invention, in the arc welding control method, the state of reverse feeding is a feeding amount of the reverse feeding, and the reference state is a reference feeding amount.

According to the present invention, the arc welding control method further comprising measuring a time period from a time where the reduction of welding current starts to a time where the shift to the arc period is performed, and changing the reference state according to the measured time period.

Advantageous Effects of Invention

According to the present invention, by discriminating the reverse feeding state, the welding current can be reduced earlier than an arc regeneration time by a suitable time period, without detecting a narrow part, and then placed in a small current value state. Consequently a generation amount of spatter can be reduced without detecting the narrow part.

EMBODIMENTS OF INVENTION

Hereinafter embodiments according to the present invention will be explained with reference to drawings.

First Embodiment

Figure 1:
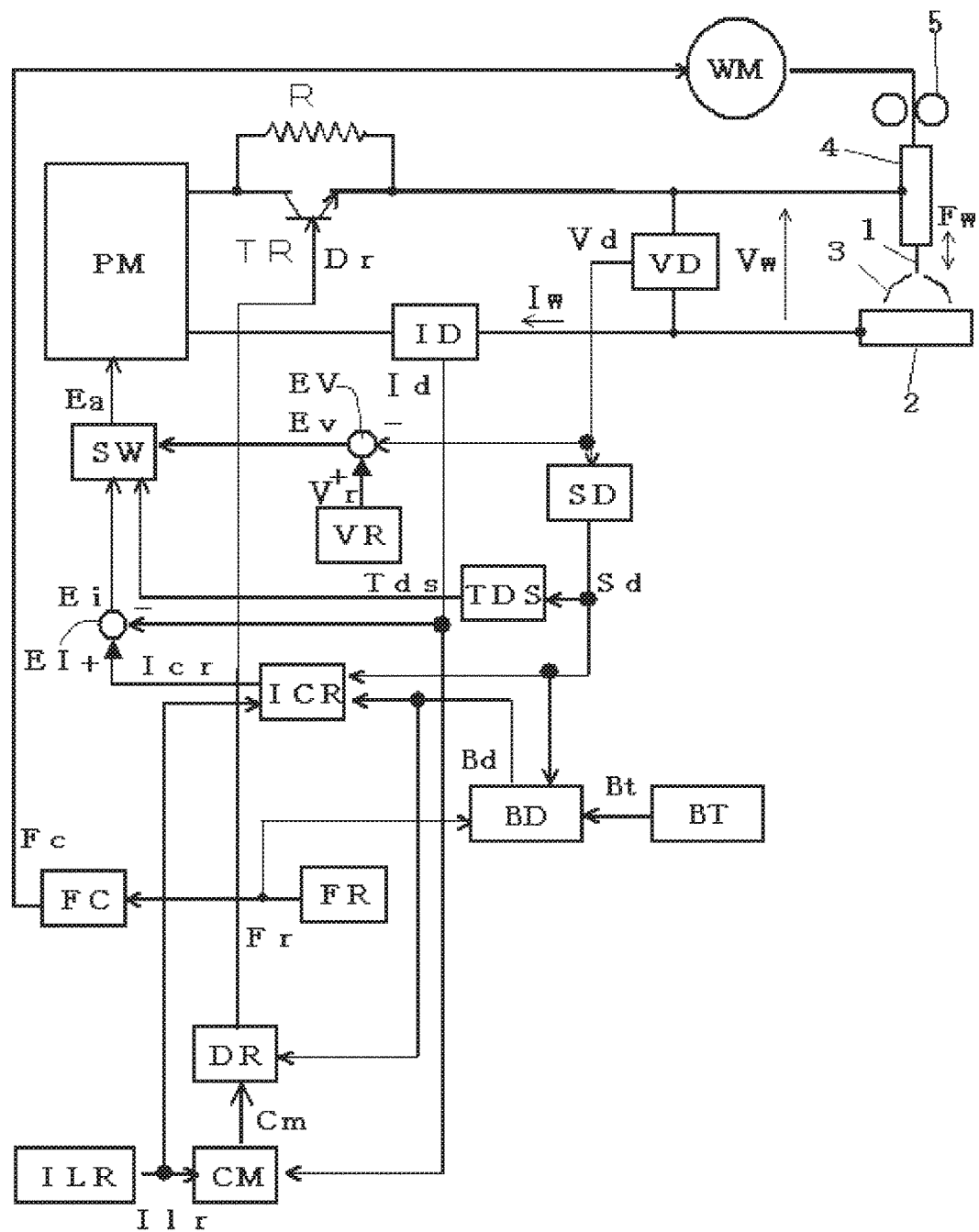
FIG. 1 A block diagram illustrating a welding power supply for implementing an arc welding control method according to a first embodiment of the present invention.

FIG. 1 is a block diagram illustrating a welding power supply for implementing an arc welding control method according to a first embodiment of the present invention. Hereinafter individual blocks will be explained with reference to this figure.

Using a power of three-phase 200V or the like from a commercial power supply (not shown) as input, a power supply main circuit PM subjects the input power to an output control such as an inverter control according to an error amplified signal Ea described later, and outputs a welding voltage Vw and a welding current Iw. Although not shown in the figure, this power supply main circuit PM includes a primary rectifier for rectifying the commercial power supply, a smoothing capacitor for smoothing the rectified DC, an inverter circuit for converting the smoothed DC into a high-frequency AC, a high-frequency transformer for stepping down the high-frequency AC to a voltage value suitable for welding, a secondary rectifier for rectifying the stepped-down high-frequency AC to a DC, a reactor for smoothing the rectified DC, a modulation circuit which uses the error amplified signal Ea as input and performs a pulse width modulation control, and an inverter driving circuit which uses a pulse width modulation control signal as input and drives switching elements of the inverter circuit.

A current decreasing resistor R is inserted between the power supply main circuit PM and a welding torch 4. The current decreasing resistor R is set to have a value (about from 0.5 to 3Ω) ten times or more as large as a short-circuit load (about from 0.01 to 0.03Ω). When the current decreasing resistor R is inserted into a current path, energy accumulated in a DC reactor within the welding power supply and a reactor of an external cable is rapidly discharged. A transistor TR is connected in parallel to the current decreasing resistor R and controlled so as to be turned on/off according to a drive signal Dr described later.

Using a feed control signal Fc described later as input, a feeding motor WM feeds a welding wire 1 at a feeding rate Fw in a manner of alternating forward feeding and reverse feeding periodically. A motor having high transient responsiveness is used as the feeding motor WM. In some cases, the feeding motor WM is installed near a tip of the welding torch 4 in order to increase a change rate of the feeding rate Fw and an inversion speed of the feeding direction of the welding wire 1. Further in some cases, a push-pull feeding system is configured by using two feeding motors WM.

The welding wire 1 is fed within the welding torch 4 in accordance with rotation of a feeding roll 5 coupled to the feeding motor WM and thus an arc 3 is generated between this wire and base material 2. A welding voltage Vw is applied between a power supply tip (not shown) within the welding torch 4 and the base material 2, and thus a welding current Iw flows.

A welding current detection circuit ID detects the welding current Iw and outputs a welding current detection signal Id. A welding voltage detection circuit VD detects the welding voltage Vw and outputs a welding voltage detection signal Vd.

Using the welding voltage detection signal Vd as input, a short-circuit discrimination circuit SD outputs a short-circuit discrimination signal Sd. In a case where a value of the welding voltage detection signal is less than a predetermined short-circuit/arc discrimination value (set to about 10V), the discrimination circuit determines to be a short-circuiting period and outputs the discrimination signal of a high level. In a case where a value of the welding voltage detection signal is the discrimination value or more, the discrimination circuit determines to be an arc period and outputs the discrimination signal of a low level.

As described later with reference to (A) of FIG. 2, a feeding-rate setting circuit FR outputs a feeding-rate setting signal Fr having a predetermined pattern of alternating the forward feeding and the reverse feeding periodically Using the feeding-rate setting signal Fr as input, a feeding control circuit FC outputs, to the feeding motor WM, the feeding control signal Fc for feeding the welding wire 1 at the feeding rate Fw corresponding to the setting value of this setting signal.

A reference-state setting circuit BT outputs a predetermined reference-state setting signal Bt. Using the reference-state setting signal Bt, the feeding-rate setting signal Fr and the short-circuit discrimination signal Sd as input, a reverse-feeding state discrimination circuit BD outputs a reverse-feeding state discrimination signal Bd in the following manner. That is, the reverse-feeding state discrimination signal becomes a high level when a reverse feeding state calculated from the feeding-rate setting signal Fr reaches a reference state set by the reference-state setting signal Bt, in a state where the short-circuit discrimination signal Sd is the high level (short-circuiting period). In contrast, the reverse-feeding state discrimination signal becomes a low level at a time where the short-circuit discrimination signal Sd changes to the low level (arc period). One of the following four reverse-feeding states is selectively used.

(1) In a case where the reverse feeding state is a time period from start of the reverse feeding: Clocking a time period from a time (starting time of the reverse feeding) where the feeding-rate setting signal Fr changes to a negative value (reverse feeding) from a positive value (forward feeding), and outputting the reverse-feeding state discrimination signal Bd which becomes the high level at a time where the time period reaches a reference time period set by the reference-state setting signal Bt.

(2) In a case where the reverse feeding state is a reverse feeding rate: Outputting the reverse-feeding state discrimination signal Bd which becomes the high level at a time where, after the time (starting time of the reverse feeding) where the feeding-rate setting signal Fr changes to the negative value (reverse feeding) from the positive value (forward feeding), a value (reverse feeding rate) of the feeding-rate setting signal Fr reaches a reference feeding rate set by the reference-state setting signal Bt.

(3) In a case where the reverse feeding state is a phase of the reverse feeding: Outputting the reverse-feeding state discrimination signal Bd which becomes the high level at a time where a phase of a reverse feeding period (a time period of the negative value) of the feeding-rate setting signal Fr reaches a reference phase set by the reference-state setting signal Bt.

(4) In a case where the reverse feeding state is a feeding amount of the reverse feeding: Calculating an integrated value (feeding amount of the reverse feeding) of absolute values of the feeding-rate setting signal Fr from a time (starting time of the reverse feeding) where the feeding-rate setting signal Fr changes to the negative value (reverse feeding) from the positive value (forward feeding), and outputting the reverse-feeding state discrimination signal Bd which becomes the high level at a time where the integrated value reaches a reference feeding amount set by the reference-state setting signal Bt.

A low-level current setting circuit ILR outputs a predetermined low-level current setting signal Ilr. Using the low-level current setting signal Ilr and the welding current detection signal Id as input, a current comparison circuit CM outputs a current comparison signal Cm which becomes a high level in a case of Id<Ilr and a low level in a case of Id≥Ilr. Using the current comparison signal Cm and the reverse-feeding state discrimination signal Bd as input, a driving circuit DR outputs, to a base terminal of the transistor TR, a drive signal Dr which changes to a low level upon the change of the reverse-feeding state discrimination signal Bd to the high level, and thereafter changes to a high level upon change of the current comparison signal Cm to the high level. Thus the drive signal Dr changes to the low level when the reverse feeding state reaches the reference state, thereby placing the transistor TR in the off state. Consequently as the current decreasing resistor R is inserted into the current path, the welding current Iw flowing in the short-circuit load reduces rapidly. Then when the welding current Iw thus rapidly reduced reduces to a value of the low-level current setting signal Ilr, the drive signal Iw changes to the high level, thereby placing the transistor TR in the on state. Thus as the current decreasing resistor R is short-circuited, a normal state is restored.

Using the short-circuit discrimination signal Sd, the low-level current setting signal Ilr and the reverse-feeding state discrimination signal Bd as input, a current control setting circuit ICR performs the following processing and outputs a current control setting signal Icr. 1) During a predetermined initial period from a time where the short-circuit discrimination signal Sd changes to the high level (short circuit), outputting a predetermined initial current setting value as the current control setting signal Icr. 2) Thereafter increasing a value of the current control setting signal Icr from the initial current setting value to a predetermined peak setting value with a predetermined inclination upon short-circuit, and maintaining the peak setting value. 3) When the reverse-feeding state discrimination signal Bd changes to the high level, changing a value of the current control setting signal Icr to the value of the low-level current setting signal Ilr and maintaining the changed value. 4) When the short-circuit discrimination signal Sd changes to the low level (arc), increasing the current control setting signal Icr to a predetermined high-level current setting value with a predetermined inclination upon arc and maintaining the increased value.

Using the short-circuit discrimination signal Sd as input, an off-delay circuit TDS outputs a delay signal Tds which is off-delayed by a predetermined delay time from a time at which the short-circuit discrimination signal changes to the low level from the high level. Thus this delay signal Tds changes to a high level in response to the start of the short-circuiting period and changes to a low level by being off-delayed by the delay time after regeneration of an arc.

A current error amplifying circuit EI amplifies an error between the current control setting signal Icr (+) and the welding current detection signal Id (−) and outputs a current error amplified signal Ei.

A voltage setting circuit VR outputs a predetermined voltage setting signal Vr for setting the welding voltage during the arc period. A voltage error amplifying circuit EV amplifies an error between the voltage setting signal Vr (+) and the welding voltage detection signal Vd (−) and outputs a voltage error amplified signal Ev.

Using the current error amplified signal Ei, the voltage error amplified signal Ev and the delay signal Tds as input, a control switching circuit SW outputs the current error amplified signal Ei as the error amplified signal Ea in a case where the delay signal Tds is at the high level (a period from the start of short circuit to a time elapsing the delay time after regeneration of the arc), whilst outputs the voltage error amplified signal Ev as the error amplified signal Ea in a case where the delay signal is at the low level (arc). According to this circuit, constant current control is performed during both the short-circuiting period and the delay period, whilst constant voltage control is performed during the arc period other than these periods.

Figure 2:
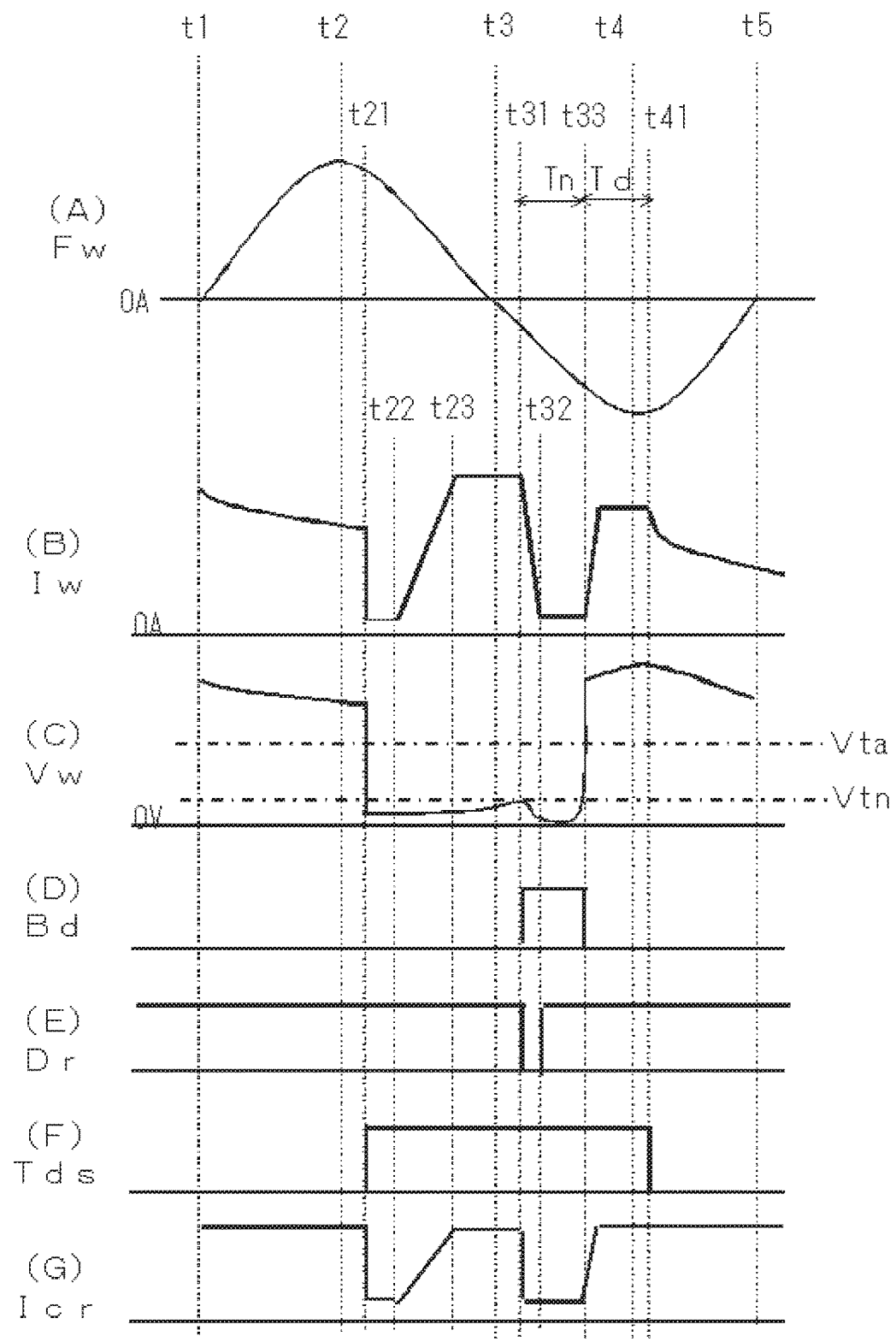
FIG. 2 A timing chart illustrating individual signals in the welding power supply of FIG. 1, for explaining the arc welding control method according to the first embodiment of the present invention.

FIG. 2 is a timing chart illustrating individual signals in the welding power supply of FIG. 1, for explaining the arc welding control method according to the first embodiment of the present invention. (A) of this figure shows temporal change of the feeding rate Fw of the welding wire 1, (B) of this figure shows temporal change of the welding current Iw, (C) of this figure shows temporal change of the welding voltage Vw, (D) of this figure shows temporal change of the reverse-feeding state discrimination signal Bd, (E) of this figure shows temporal change of the drive signal Dr, (F) of this figure shows temporal change of the delay signal Tds, and (G) of this figure shows temporal change of the current control setting signal Icr. Hereinafter explanation will be made with reference to this figure.

Figure 4:
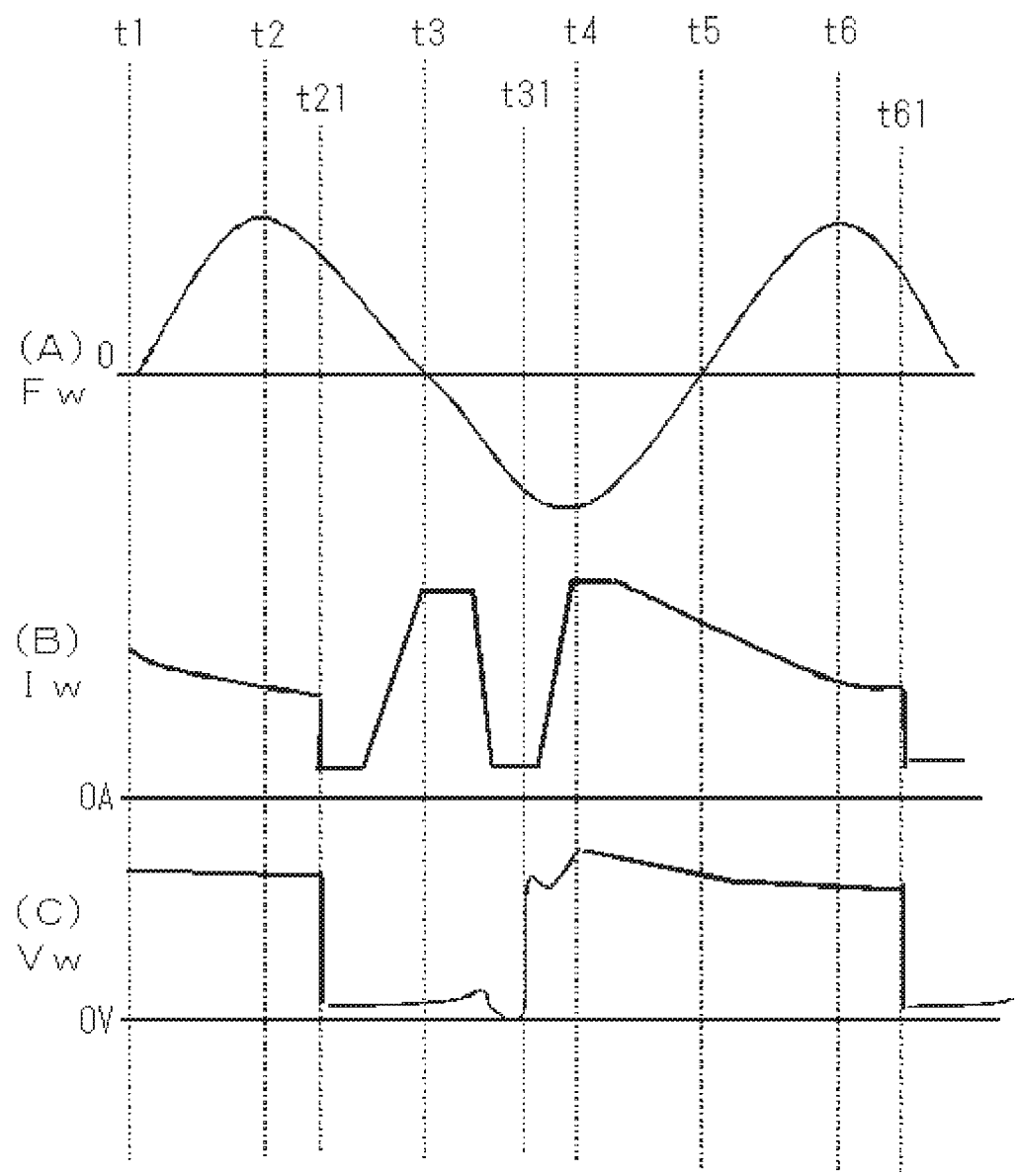
FIG. 4 A waveform diagram of a welding method of a related art in which forward feeding and reverse feeding are repeated periodically as to a feeding rate and a narrow-part detection control is performed.

As shown in (A) of this figure, in the feeding rate Fw, positive values on an upper side than 0 represent that the welding wire is fed forwardly, and negative values on a lower side than 0 represent that the welding wire is fed reversely. As the feeding rate Fw shown in (A) of this figure is set by the feeding-rate setting signal Fr (not shown), the feeding rate has a similar waveform as the feeding-rate setting signal. Further the feeding rate Fw shown in (A) of this figure has the same waveform as the feeding rate Fw shown in (A) of FIG. 4.

As shown in (A) of this figure, the feeding rate Fw is 0 at a time t1. A period from the time t1 to a time t2 corresponds to a forward feeding acceleration period. The feeding rate is the maximum value of the forward feeding at the time t2. A period from the tune t2 to a time t3 corresponds to a forward feeding deceleration period. The feeding rate is 0 at the time t3. A period from the time t3 to a time t4 corresponds to a reverse feeding acceleration period. The feeding rate is the maximum value of the reverse feeding at the time t4. A period from the time t4 to a time t5 corresponds to a reverse feeding deceleration period. Although the feeding rate changes sinusoidally in this figure, the feeding rate may change in a form of a triangular wave or a trapezoidal wave. For example, the forward feeding period from the time t1 to the time t3 is 5.4 ms, the reverse feeding period from the time t3 to the time t5 is 4.6 ms, and a single cycle is 10 ms. For example, the maximum value of the forward feeding is 50 m/min and the maximum value of the reverse feeding is −40 m/min An average value of the feeding rate Fw in this case is about +4 m/min and an average value of the welding current is about 150 A.

Short circuit between the welding wire and the base material occurs mostly before or after the maximum value of the forward feeding at the time t2. This figure shows a case where the short circuit occurs at a time t21 during the forward feeding deceleration period after the maximum value of the forward feeding. If the short circuit occurs at the time t21, the welding voltage Vw reduces rapidly to a short-circuit voltage value of a few volts as shown in (C) of this figure. When discrimination is made that this welding voltage Vw reduces smaller than a short-circuit/arc discrimination value Vta, the delay signal Tds is changed to the high level from the low level as shown in (F) of this figure. In response to this, as shown in (G) of this figure, the current control setting signal Icr changes at the time t21 from the predetermined high-level current setting value to the predetermined initial current setting value of a small value.

Then as the reverse feeding acceleration period starts from the time t3, the feeding rate Fw is switched to the reverse feeding direction. As shown in (G) of this figure, the current control setting signal Icr is the initial current setting value during the predetermined initial period from the time t21 to a time t22, increases with the predetermined inclination upon short-circuit during a period from the time t22 to a time t23, and is the predetermined peak setting value during a period from the time t23 to a time t31. As descried above, as the constant current control is performed during the short-circuiting period, the welding current Iw is controlled to a value corresponding to the current control setting signal Icr. Thus as shown in (B) of this figure, the welding current Iw rapidly reduces at the time t21 from the welding current during the arc period, is an initial current value during the initial period from the time t21 to the time t22, increases with an inclination upon short-circuit during the period from the time t22 to the time t23, and is a peak value during the period from the time t23 to the time t31. For example, the initial period is set to 1 ms, the initial current is set to 50 A, the inclination upon short-circuit is set to 400 A/ms and the peak value is set to 450 A. As shown in (D) of this figure, the reverse-feeding state discrimination signal Bd is the high level during a period from the time t31 to a time t33 described later and is the low level during a period other than this period. As shown in (E) of this figure, the drive signal Dr is the low level during a period from the time t31 to a time t32 described later and is the high level during a period other than this period. Accordingly, during the period before the time t31 in this figure, as the drive signal Dr is the high level, the transistor TR of FIG. 1 is placed in the on state. Thus as the current decreasing resistor R is short-circuited, the power supply is placed in the same state as a normal consumable electrode type arc welding power supply.

As shown in (C) of this figure, the welding voltage Vw increases almost from the time t23 at which the welding current Iw reaches the peak value. This is because a narrow part is gradually formed at a droplet due to the reverse feeding of the welding wire and a pinch force of the welding current Iw.

If the reverse feeding state reaches the reference state at the time t31, the reverse-feeding state discrimination signal Bd changes to the high level as shown in (D) of this figure. In response to this, as shown in (E) of this figure, as the drive signal Dr becomes the low level, the transistor TR of FIG. 1 is turned off and hence the current decreasing resistor R is inserted into the current path. Simultaneously as shown in (G) of this figure, the current control setting signal Icr reduces to the value of the low-level current setting signal Ilr. Thus as shown in (B) of this figure, the welding current Iw rapidly reduces to a low-level current value Il from the peak value. Then, when the welding current Iw reduces to the low-level current value Il at the time t32, the drive signal Dr is restored to the high level as shown in (E) of this figure. Thus the transistor TR of FIG. 1 is placed in the on state and hence the current decreasing resistor R is short-circuited. As shown in (B) of this figure, as the current control setting signal Icr is maintained to the low-level current setting signal Ilr, the welding current Iw maintains the low-level current value Il until an arc is regenerated at the time t33. Accordingly the transistor TR is placed in the off state only during a period from the time t31 at which the reverse-feeding state reaches the reference state to the time t32 at which the welding current Iw reduces to the low-level current value Il. As shown in (C) of this figure, as the welding current Iw becomes small, the welding voltage Vw once reduces from the time t31 and thereafter increases rapidly. The low-level current value Il is set to, for example, 50 A.

If the narrow part is promoted due to the reverse feeding of the welding wire and the pinch force of the flowing of the welding current Iw and an arc is regenerated at the time t33, a value of the welding voltage Vw becomes the short-circuit/arc discrimination value Vta or more as shown in (C) of this figure. A period from the time t31 at which the narrow part is formed to the time t33 at which the arc is regenerated is called as a narrow-part period Tn.

As the reverse feeding deceleration period starts from the time t4 immediately after the regeneration of the arc, the feeding rate Fw reduces while maintains the reverse feeding state, as shown in (A) of this figure. If the arc is regenerated at the time t33, as shown in (G) of this figure, a value of the current control setting signal Icr increases with the predetermined inclination upon arc from the value of the low-level current setting signal Ilr, then reaches the high-level current setting value and thereafter maintains this value. As shown in (F) of this figure, the delay signal Tds maintains the high level until a time t41 at which a predetermined delay period Td elapses after the regeneration of the arc at the time t33. Thus as the welding power supply is subjected to the constant current control until the time t41, as shown in (B) of this figure, the welding current Iw increases with an inclination upon arc from the time t33, then reaches a high-level current value and maintains this value until the time t41. As shown in (C) of this figure, the welding voltage is placed in a high-level voltage value state during the delay period Td from the time t33 to the time t41. As shown in (D) of this figure, the reverse-feeding state discrimination signal Bd changes to the low level due to the regeneration of the arc at the time t33. For example, the inclination upon arc is set to 400 A/ms, the high-level current value is set to 450 A and the delay period Td is set to 2 ms.

As shown in (F) of this figure, the delay signal Tds changes to the low level at the time t41. As a result, the welding power supply is switched to the constant voltage control from the constant current control. Until the time t5 from the time t33 at which the arc is regenerated, as the welding wire is reversely fed, the arc length becomes longer gradually. As the forward feeding acceleration period starts from the time t5, the feeding rate Fw is switched to the forward feeding as shown in (A) of this figure. If the welding power supply is switched to the constant voltage control at the time t41, the welding current Iw gradually reduces from the high-level current value as shown in (B) of this figure. Similarly, the welding voltage Vw gradually reduces from the high-level voltage value as shown in (C) of this figure.

As described above, if the reverse feeding state reaches the reference state at the time t31, as the current decreasing resistor is inserted in the current path, the welding current Iw is rapidly reduced. Thus the current value upon the regeneration of the arc at the time t33 can be controlled to the small value. Thus a generation amount of spatter can be reduced to a large extent.

As described above, the reverse-feeding state discrimination signal Bd shown in (D) of this figure changes to the high level 1) when the time period from the start of reverse feeding reaches the reference time period, 2) when the reverse feeding rate reaches the reference feeding rate, 3) when the phase of reverse feeding reaches the reference phase or 4) when the feeding amount of reverse feeding reaches the reference feeding amount. Supposing that a phase range of one cycle from the time t1 to the time t5 is 0 to 360 degree, a phase range of the reverse feeding period from the time t3 to the time t5 is 180 to 360 degree. Thus a phase range of the reverse feeding represents this angle range. Further as the feeding amount of reverse feeding is an integrated value of absolute values of the reverse feeding rate, the feeding amount represents a distance of the reverse feeding of the welding wire after start of the reverse feeding.

A time at which the reverse feeding state reaches the reference state is a timing where a time period until the regeneration of an arc after the tip of welding wire separates from the base material becomes a suitable range of about 0.1 to 1.0 ms. In this manner, by discriminating the reverse feeding state, the welding current can be reduced earlier than an arc regeneration time by the suitable time period, without detecting the narrow part, and then placed in a small current-value state. Thus a generation amount of spatter can be reduced to a large extent.

According to the first embodiment, the reduction of welding current is started from the time where the reverse feeding state reaches the predetermined reference state. Thus, by discriminating the reverse feeding state, the welding current can be reduced earlier than the arc regeneration time by the suitable time period, without detecting the narrow part, and then placed in the small current-value state. Consequently the generation amount of spatter can be reduced without detecting the narrow part.

Further if the reverse feeding state is discriminated according to the reverse feeding rate, the phase of reverse feeding or the feeding amount of reverse feeding, the reducing timing of welding current is kept to be suitable even if an amplitude of the reverse feeding changes according to a welding condition. Thus readjustment of the timing is not required. As a result, a work efficiency can be enhanced. This is because an arc is regenerated with a high probability after the suitable range from the time where the reverse feeding rate reaches the reference feeding rate, from the time where the phase of reverse feeding reaches the reference phase, or from the time where the feeding amount of reverse feeding reaches the reference feeding amount.

Second Embodiment

According to a second embodiment of the present invention, a time period (narrow-part period Tn) from a time, where the reduction of welding current starts after the reverse feeding state reaches the reference state during the short-circuiting period, to a time where the shift to the arc period is performed is measured, and the reference state is changed according to the measured time period.

Figure 3:
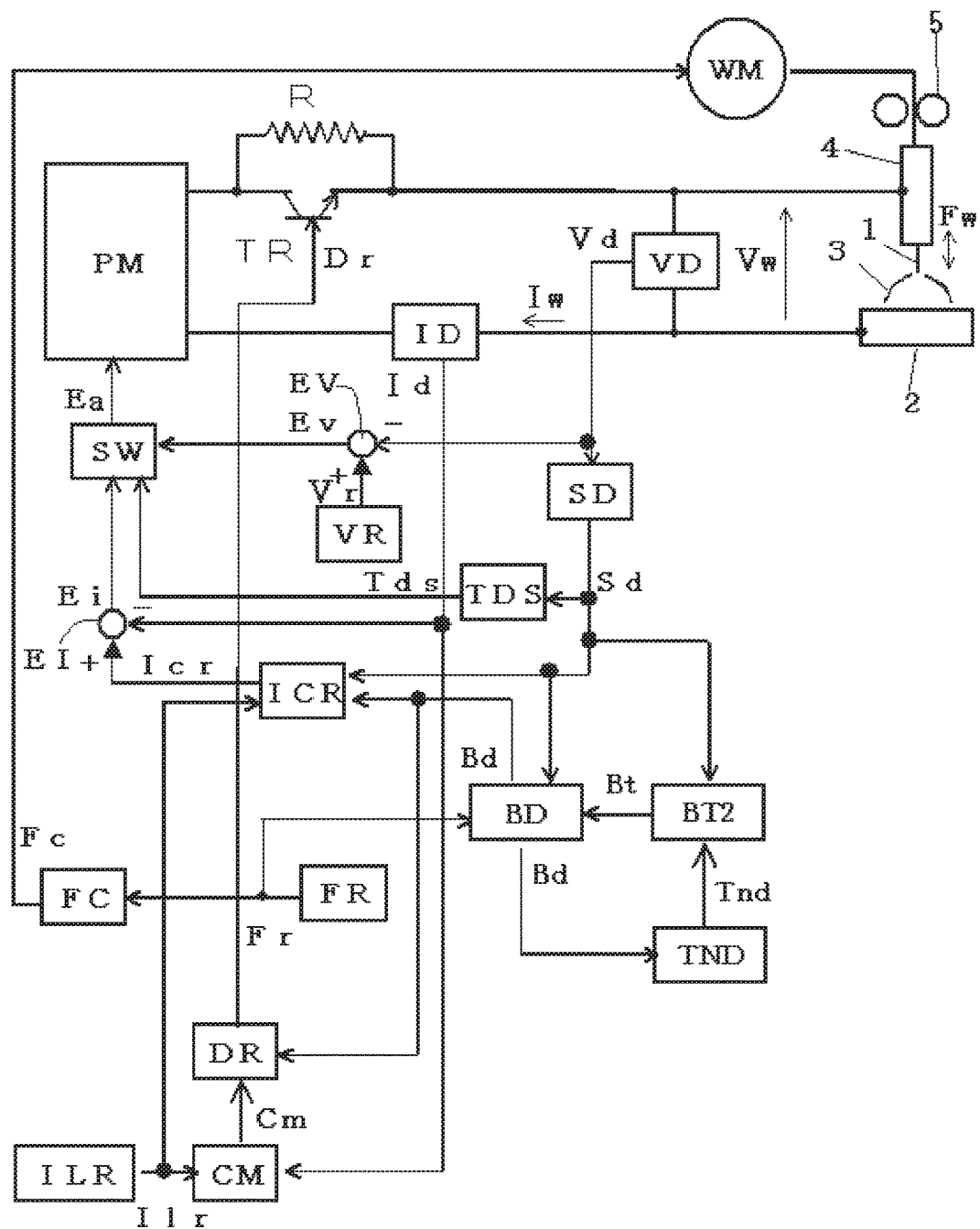
FIG. 3 A block diagram illustrating a welding power supply for implementing an arc welding control method according to a second embodiment of the present invention.

FIG. 3 is a block diagram illustrating a welding power supply for implementing an arc welding control method according to the second embodiment of the present invention. This figure corresponds to FIG. 1, and blocks identical to those of FIG. 1 are referred to by the same symbols, with explanation thereof being omitted. In this figure, a narrow-part time measurement circuit TND is added to FIG. 1 and the reference-state setting circuit BT of FIG. 1 is replaced by a second reference-state setting circuit BT2. Hereinafter these individual blocks will be explained with reference to this figure.

Using the reverse-feeding state discrimination signal Bd as input, the narrow-pan time measurement circuit TND measures a time period during which the reverse-feeding state discrimination signal Bd is at the high level and outputs the measured time period as a narrow-part time measurement signal Tnd. As described above, the reverse-feeding state discrimination signal Bd changes to the high level at a time where the reverse feeding state reaches the reference state during the short-circuiting period, and changes to the low level at a time where the shift to the arc period is performed. If the reverse-feeding state discrimination signal Bd changes to the high level, discrimination is made that a narrow part is formed, and the welding current Iw is reduced rapidly.

Using the narrow-part time measurement signal Tnd and the short-circuit discrimination signal Sd as input, the second reference-state setting circuit BT2 outputs the reference-state setting signal Bt in the following manner. That is, each time the short-circuit discrimination signal Sd changes to the low level (arc period) from the high level (short-circuiting period), a present value of the reference-state setting signal Bt is reduced by a predetermined value in a case where the narrow-part time measurement signal Tnd is an upper limit or more of a predetermined suitable range, whilst a present value of the reference-state setting signal is increased by the predetermined value in a case where the narrow-part time measurement signal is less than a lower limit of the suitable range. A value of the reference-state setting signal Bt is set to a predetermined initial value upon start of the welding. According to this circuit, a value of the reference-state setting signal Bt is suitably corrected depending on a value of the narrow-part time measurement signal Tnd. The suitable rang is, for example, from 0.1 to 1.0 ms. In this case, the upper limit is 1.0 ms and the lower limit is 0.1 ms.

A timing chart of individual signals in the welding power supply shown in FIG. 3 is same as that of FIG. 2, and hence the explanation thereof is omitted. However this timing chart differs only in a point that the reference state (reference-state setting signal Bt) in the next short-circuiting period is corrected depending on the narrow-part period Tn from the time t31 to the time t33 of FIG. 2. Consequently a timing corresponding to the time 31 of the next short-circuiting period is suitably corrected.

According to the second embodiment of the present invention, the time period (narrow-part period Tn) from the time where the reduction of welding current starts to the time where the shift to the arc period is performed is measured, and the reference state (reference-state setting signal Bt) is changed according to the measured time period. As a result, according to the second embodiment, in addition to the effects of the first embodiment, the welding current can be reduced earlier than the arc regeneration time by the suitable time period by discriminating the reverse feeding state, without detecting the narrow part, and then the welding current can be placed in the small current-value state. Further, the reducing timing of welding current can always be automatically adjusted to the suitable timing. Consequently the generation amount of spatter can be reduced to the maximum without detecting the narrow part.

INDUSTRIAL APPLICABILITY

The present invention can provide the arc welding control method which, in the welding method of alternating the feeding of the welding wire between the forward feeding and the reverse feeding periodically, can reduce the generation amount of spatter without detecting the narrow part.

Although the present invention is explained with reference to the particular embodiments, the present invention is not limited thereto but the embodiments may be changed in various manners within a range not departing from the technical concept disclosed in the present invention.

This application is based on Japanese Patent Application (Japanese Patent Application No. 2014-046078) filed on Mar. 10, 2014, the content of which is incorporated herein by reference.

DESCRIPTION OF REFERENCE NUMERALS 1 welding wire
2 base material
3 arc
4 welding torch
5 feeding roll
BD reverse-feeding state discrimination circuit
Bd reverse-feeding state discrimination signal
BT reference-state setting circuit
Bt reference-state setting signal
BT2 second reference-state setting circuit
CM current comparison circuit
Cm current comparison signal
DR driving circuit
Dr drive signal
Ea voltage error amplified signal
EI current error amplifying circuit
Ei current error amplified signal
EV voltage error amplifying circuit
Ev voltage error amplified signal
FC feeding control circuit
Fc feeding control signal
FR feeding-rate setting circuit
Fr feeding-rate setting signal
Fw feeding rate
ICR current control setting circuit
Icr current control setting signal
ID welding current detection circuit
Id welding current detection signal Il low-level current value
ILR low-level current setting circuit
Ilr low-level current setting signal
Iw welding current
PM power supply main circuit
R current decreasing resistor
SD short-circuit discrimination circuit
Sd short-circuit discrimination signal
SW control switching circuit
Td delay period
TDS off-delay circuit
Tds delay signal
Tn narrow-part period
TND narrow-part time measurement circuit
Tnd narrow-part time measurement signal
TR transistor
VD welding voltage detection circuit
Vd welding voltage detection signal
VR voltage setting circuit
Vr voltage setting signal
Vta short-circuit/arc discrimination value
Vw welding voltage
WM feeding motor

The invention claimed is:

1. An arc welding control method of alternating feeding of a welding wire between forward feeding and reverse feeding periodically to generate a short-circuiting period and an arc period in a manner that shifting to the arc period is performed by reducing a welding current in the reverse feeding during the short-circuiting period, the arc welding control method comprising:
   outputting, by a feeding-rate setting circuit, a feeding rate setting signal having a predetermined pattern of alternating the forward feeding and the reverse feeding periodically;
   outputting, by a feeding control circuit, a feeding control signal for feeding the welding wire at a feeding rate corresponding to the feeding rate setting signal;
   outputting, by a reference-state setting circuit, a predetermined reference-state setting signal that specifies a reference state;
   performing periodic alternating feeding, by a feeding motor and based on the feeding rate setting signal, the welding wire in a state of forward feeding and a state of reverse feeding to generate the short circuiting period and the arc period;
   determining, by a reverse-feeding state discrimination circuit, during the state of reverse feeding, that the state of the reverse feeding reached the reference state; and
   starting, by the reverse-feeding state discrimination circuit, reduction of the welding current from a time where the state of the reverse feeding reaches the reference state.

2. The arc welding control method according to claim 1, wherein the reference state is a reference time period, and the state of reverse feeding includes a time period from start of the reverse feeding until the reference time period.

3. The arc welding control method according to claim 1, wherein the state of reverse feeding is a feeding rate in a reverse feeding direction, and the reference state is a reference feeding rate.

4. The arc welding control method according to claim 1, wherein the reference state is a reference phase, and the state of reverse feeding includes a phase of the reverse feeding to the reference phase.

5. The arc welding control method according to claim 1, wherein the reference state is a reference feeding amount, and the state of reverse feeding includes a feeding amount of the welding wire during the reverse feeding until the feeding amount reaches the reference feeding amount.

6. The arc welding control method according to claim 1, further comprising:
   measuring a time period from a time when the reduction of welding current starts at a time when the shift to the arc period is performed; and
   changing the reference state according to the measured time period.

* * * * *